United States Patent [19]

Snook

[11] Patent Number: 4,948,765
[45] Date of Patent: Aug. 14, 1990

[54] REFRACTORY COATING FOR MAKING REFRACTORY SHELLS
[75] Inventor: Robert L. Snook, Houston, Tex.
[73] Assignee: Ashland Oil, Inc., Russell, Ky.
[21] Appl. No.: 322,315
[22] Filed: Mar. 10, 1989
[51] Int. Cl.$^5$ .............................................. C04B 35/10
[52] U.S. Cl. ................................... 501/127; 106/38.2; 106/38.22; 29/527.5
[58] Field of Search ............................ 106/38.22, 38.2; 501/127; 29/527.5

[56] References Cited

U.S. PATENT DOCUMENTS

| | | | |
|---|---|---|---|
| 3,899,612 | 8/1975 | Emblem | 427/133 |
| 3,967,003 | 6/1976 | Emblem et al. | 427/133 |
| 3,975,202 | 8/1976 | Emblem et al. | 106/65 |
| 4,216,815 | 8/1980 | Feagin | 164/26 |

Primary Examiner—Mark L. Bell
Assistant Examiner—David M. Brunsman
Attorney, Agent, or Firm—David L. Hedden

[57] ABSTRACT

This invention relates to refractory coatings and their use. The refractory coating comprises:
 (1) a carrier, generally water;
 (2) an alpha alumina monohydrate;
 (3) an aluminum hydroxyhalide; and
 (4) a refractory material.

The refractory coatings are used for coating patterns which are used to make refractory shells.

14 Claims, No Drawings

REFRACTORY COATING FOR MAKING REFRACTORY SHELLS

TECHNICAL FIELD

This invention relates to refractory coating which are stable suspensions and contain a high level of solids. The coatings comprise: (1) a carrier, preferably water; (2) an alpha alumina monohydrate; (3) an aluminum hydroxyhalide; and a refractory material.

The coatings are used to make refractory shells by applying the refractory coating to an expendable pattern which is preferably removed when the shell is formed.

BACKGROUND OF THE INVENTION

It is known to use refractory coatings to make refractory shells by coating expendable patterns (such as polystyrene or wax) and removing the pattern after curing the refractory shell. The refractorY shell is then cured chemically, by heating, or both. It is then used as a mold and/or core assembly to make a metal part by pouring molten metal into the mold and/or core assembly and allowing the metal to cool. The mold and/or core assembly is then removed.

In this process, the refractory coating is typically prepared from a refractory material, binder, and water at the site where the shell is to be made. The coating typically has a solids content of at least 50 percent by weight based upon the total weight of the coating. Coatings with higher solids contents (at least 55 percent by weight) are preferred because they minimize cracking. The problem is that increased solids level will generally result in higher viscosities which tend to make it more difficult to to adequately coat the shell. Although such refractory coatings produce effective shells and casings, they must be mixed at the site; they must be stirred regularly once prepared; and they are not storage stable once prepared.

A pre-mixed, storage-stable refractory coating would be useful because it would not require extensive mixing at the site and would not require regular stirring. Furthermore, if there were a power failure, the refractory coating would not agglomerate in the mixer forcing its time consuming removal.

SUMMARY OF THE INVENTION

This invention relates to refractory coatings comprising:
1. a carrier, generally water;
2. a suspending amount of an alpha alumina monohydrate;
3. a binding amount of an aluminum hydroxyhalide; and
4. a refractory material.

The refractory coatings are stable suspensions, contain a high level of solids, and have a viscosity sufficient to adequately coat even intricate patterns. The combination of these three properties in a refractory coating is highly desirable. Higher solids levels will generally result in a refractory shell which is less likely to crack. However, this high solids level can not be achieved with an excessive increase in the viscosity of the coating or a phase separation of the solids and liquids. Although it is difficult to obtain one of these desired properties without having an adverse effect on either one or both of the other, the subject coating has achieved this.

The refractory coatings are used for making refractory shells by applying the coating to expendable patterns made from materials such as wax or polystyrene and curing chemically, by heating, or both.

Another aspect of this invention relates to a process for preparing the refractory coatings comprising:
1. forming a suspension by mixing a carrier, an alpha alumina monohydrate and sufficient acid to result in a pH of less than 3.0;
2. mixing into said suspension an aluminum hydroxyhalide; and
3. mixing a refractory material into the mixture prepared by steps (1) and (2).

Preferably, the refractory coating also contains an organic binder.

Other aspects of the invention relate to the preparation of refractory shells and their use in the coating of metals.

The refractory coatings are particularly useful because they are pre-mixed and shipped to the site for use with little or no additional mixing. Furthermore, they will not gel or settle out over extended use.

BEST MODE AND OTHER EMBODIMENTS

In accordance with this invention, a refractory coating is preferably prepared by first forming a suspension by mixing the carrier and an alpha alumina monohydrate, and then adding a peptizing agent which is used in an amount sufficient to result in a suspension with a pH less than 3.0. The peptizing agent is preferably added to the carrier after the alpha alumina monohydrate is dispersed into the carrier.

The amount of alpha alumina monohydrate added to the carrier is an amount sufficient to form a suspension, generally from 1 to 25 weight percent based upon the water, preferably from 10 to 15 weight percent. For purposes of this invention, the resulting mixture is a suspension if the solids are more or less uniformily distributed in the liquid, and any particles which do settle out can be easily redispersed. Furthermore, the term "suspension" is used interchangeably with the term "dispersion."

Alpha alumina monohydrates used to prepare the suspension are well know compositions. Examples of commercially available materials include DISPERAL® produced by Condea Chemie, GMBH, VERSAL 950®, supplied by Kaiser Aluminum and Chemical Corp.; and CATAPAL® produced by Vista Chemical Company. The alpha alumina monohydrates are relatively pure (including relatively little, if any, hydrate phases other than monohydrates) and have a high surface area.

The suspension may contain a precursor of a modifying additive. These additives are in the form of soluble salts, typically water soluble, and typically consist of a metal-containing compound and can be a precursor of the oxides of magnesium, zinc, cobalt, nickel, zirconium, hafnium, chromium and titanium. The exact proportions of these components that are present in the suspension are not critical to this invention and thus can vary to convenience.

DISPERAL has a typical chemical composition of 90% alpha alumina monohydrate (also known as Boehmite or alpha aluminum oxide monohydrate), 9% water, 0.5% carbon (as primary alcohol), 0.008% silicon dioxide, 0.005% ferric oxide, 0.004% sodium silicate and 0.05% sulfur. It has a surface area (BET) of about 320 m$^2$/gm, an undispersed average particle size (as determined by sieving) of 15% (greater than 45 microns) and 85% (less than 45 microns), an average particle size, in suspension, of 0.0048 microns as determined by X-ray diffraction and a bulk density of 45 pounds per cubic foot (loose bulk) and 50 pounds per cubic foot (packed bulk).

CATAPAL SB has a typical chemical composition of 74.2% alpha alumina monohydrate, 25.8% water, 0.36% carbon, 0.008% silicon dioxide, 0.005% ferric oxide, 0.004 sodium oxide and less than 0.01% sulfur. It has a surface area (BET) of 280 m²/gm, average particle size (as determined by sieving) of 35% (less than 45 microns) and 19% (greater than 90 microns).

A peptizing agent is usually added to the suspension to form a more stable suspension. Monoprotic acids or acid compounds which may be used as the peptizing agent include acetic, hydrochloric, lactic, formic and nitric acid. Multiprotic acids are normally avoided since they rapidly gel the suspension making it difficult to handle or mix in additional components. Some commercial sources of alpha alumina monohydrate contain an acid titer (such as absorbed formic or nitric acid) to assist in forming a stable suspension.

The suspension can be formed by any suitable means which may simply be the mixing of alpha alumina monohydrate with the carrier containing a peptizing agent, or preferably by mixing the alpha alumina monohydrate with the carrier and adding the peptizing acid.

Generally used as the aluminum hydroxyhalide is one of the general formula $Al_2(OH)_n X_{(6-n)} \cdot mH_2O$ or a polymer thereof, where n is a number less than 6, m is a number less than 4 and x represents a chlorine, bromine or iodine atom. The aluminum hydroxyhalide is used in an aqueous and/or alcoholic solution.

The advantage of an alcoholic solution is that it dries more readily, but it is more expensive and difficult to use because of safety considerations.

The amount of aluminum hydroxyhalide used is an amount sufficient to bond the refractory material with sufficient strength to produce a workable shell, from 1.5 to 50 weight percent based upon the weight of the refractory, preferably from 3 to 12 weight percent.

The refractory material constitutes the major constituent of the present aqueous suspensions with the exact amount being dependent on various factors including, but not limited to the end use, the selected refractory materials, the identity of the other components, etc. Normally, the refractory material will comprise from about 50 to 80 weight percent of the total composition although it is preferred to use higher amounts for the applications described herein. Compositions comprising about 60 to 75 weight percent of refractory material are preferred. Higher solids levels will reduce the likelihood of the shell cracking.

Refractory materials useful in the present suspensions may be selected from the refractory materials known in this art. This includes, but is not limited to, quartz, silica, zirconia, zircon, mullite, aluminosilicates, alumina fused silicas and the like.

Preferably the refractory coating contains an organic binder to improve green strength. Green strength is the strength required in the coating prior to it being dried or fired. In order to obtain a strong shell mold it is necessary to apply several coats of the refractory suspension. If the coat being applied solubilizes the prior coat, then the new coat will not remain firm and it will be difficult to build up a sufficient thickness of refractory material.

Among organic binders that are useful are resins, starches, glues, dextrin, polyvinyl alcohol, polyvinyl acetate, acrylic resins, and the like. This component need be present in the refractory compositions in an amount sufficient to find the refractory materials and impart "green" strength at the low temperatures; i.e., up to about 600° F. This, in many instances, is from about 0.5 to about 10.0 weight percent of the refractory material, preferably from 1.0 to 5.0 weight percent.

Other optional components such as wetting agents, viscosity modifiers, preservatives, bacteriacides and other materials known to the art for the preparation of suspensions can be included in the suspensions of this invention.

An alcohol, such as ethyl alcohol, methyl alcohol, and isopropyl alcohol can also be used as the carrier either alone or in admixture with water.

Several coats (usually from 3 to 10) of the refractory coating are applied to the wax or plastic (usually polystyrene) pattern. Each coat is allowed to dry before adding subsequent coats. The coated pattern is then cured chemically, by heating, or both to form a shell which can be used as a mold and/or core assembly. The subject coatings are preferably used in the so-called lost foam or evaporative pattern process which involves removing the pattern from the dried coating before the coating is cured to form a shell. Furthermore, if wax is used as the pattern, it is preferable to chemically cure the shell with ammonia or some other such compound before removing the wax pattern.

The cured shell is used as a mold and/or core assembly to cast metals such as steel where the presence of carbon material from the pattern would be detrimental to the casting.

EXAMPLE

A refractory coating is prepared by adding 1.41 parts of DISPERAL ® alpha alumina monohydrate to 10.75 parts of water and reducing the pH to 2-3 by adding 0.15 part HCl (28% concentration). Then 15.63 parts of aluminum hydroxychloride solution (containing 33% by weight of solids and 67% by weight of water) are added.

Thereafter, 4.22 parts of WALPOL 40-140 polyvinyl acetate organic binder (containing 65% by weight of solids), 0.24 part of DREW L405 defoamer and 0.12 AMERSTAT (bacteriacide) are mixed with the other components.

To this mixture, 23.47 parts of ZEOSPHERE refractory and 44.01 parts of KYANITE 100 refractory are added.

After mixing thoroughly, the specific gravity is determined to be 1.90 g/cc to 1.94 g/cc. The solids content is calculated to be 76.8% by weight and 58.1% by volume. The viscosity is sufficient to adequately coat a shell.

A refractory shell is made by sequentially applying five coats of the refractory coating to a polystyrene pattern over a period of 24 hours. After each coat of refractory coating, a stucco coating of fused silica grain is applied. There is a drying time of approximately two hours between coats of the refractory coating. After the last coat has air dried, the refractory shell is oven dried for two hours at 225° F.–250° F.

The refractory shell was then heated to a temperature of 2,000° F. in a furnace where the polystyrene pattern is burned away leaving the cured, empty refractory shell.

The refractory shell is now a satisfactory mold into which molten steel is poured. The molten steel is allowed to cool, forming a casting.

The casting is removed from the refractory shell to reveal a superior coating finish. The casting is dimensionally accurate with no evidence of lustrous carbon or inclusions in the castings.

I claim:

1. A pre-mixed refractory coating composition in the form of a stable suspension comprising:
   (A) a carrier in an amount sufficient to form a suspension;
   (B) a suspending amount of alpha alumina monohydrate;
   (C) a binding amount of an aluminum hydroxyhalide; and
   (D) a refractory material in an amount of at least 50 weight percent based upon the total weight of the coating;
   wherein a peptizing agent is mixed with the carrier and alpha alumina monohydrate to lower the pH to 3.0 or less before components C and D are added and mixed.

2. The refractory coating of claim 1 wherein the carrier is water.

3. The refractory coating of claim 2 wherein an organic binder is also present in a binding amount as component (E).

4. The refractory coating of claim 3 wherein the refractory material is present in amount of at least 70.0% by weight based upon the total weight of the refractory coating.

5. The refractory coating of claim 4 wherein the weight percent of alpha alumina monohydrate to water is from 10 to 15 weight percent based upon the weight of the water.

6. The refractory coating of claim 5 wherein the weight percent of aluminum hydroxyhalide to refractory material is from 3 to 12 weight percent based upon the weight of the refractory.

7. The refractory coating of claim 6 wherein the weight percent of organic binder to refractory material is from 0.5 to 10.0 weight percent based upon the weight percent of the refractory material.

8. The refractory coating of claim 6 wherein the alpha alumina monohydrate has a surface area of about 320 $m^2$/gm, an undispersed average particle size of 15% greater than 45 microns and 85% less than 45 microns, an average particle size of about 0.0048 microns, and a bulk density of about 45 pounds per cubic foot (loose bulk) and about 50 pounds per cubic foot (packed bulk).

9. The refractory coating of claim 8 wherein the aluminum hydroxyhalide is aluminum hydroxychloride.

10. A process for preparing a refractory coating composition comprising:
    (A) forming a suspension comprising: mixing a suspending amount of alpha alumina monohydrate with a carrier in the presence of a peptizing agent such that the resulting pH of the suspension is less than 3.0;
    (B) mixing a binding amount of an aluminum hydroxyhalide with said suspension;
    (C) mixing a refractory material with the product of B.

11. The process of claim 10 wherein water is the carrier and the alpha alumina monohydrate is added to the water before adding the peptizing agent.

12. A process for preparing a refractory shell comprising coating a pattern with the refractory coating of claim 9 in an amount sufficient to produce a useable shell.

13. The process of claim 12 wherein the pattern is made of polystyrene.

14. A process for casting a metal comprising:
    (A) fabricating a mold and/or assembly which includes a refractory shell prepared in accordance with claim 13;
    (B) pouring molten metal into or around on said assembly;
    (C) allowing said metal to cool and solidify; and
    (D) separating the molded article.

* * * * *